Sept. 26, 1939.  G. L. HALL  2,173,939
LUMINOUS ADVERTISING DEVICE
Filed May 7, 1937
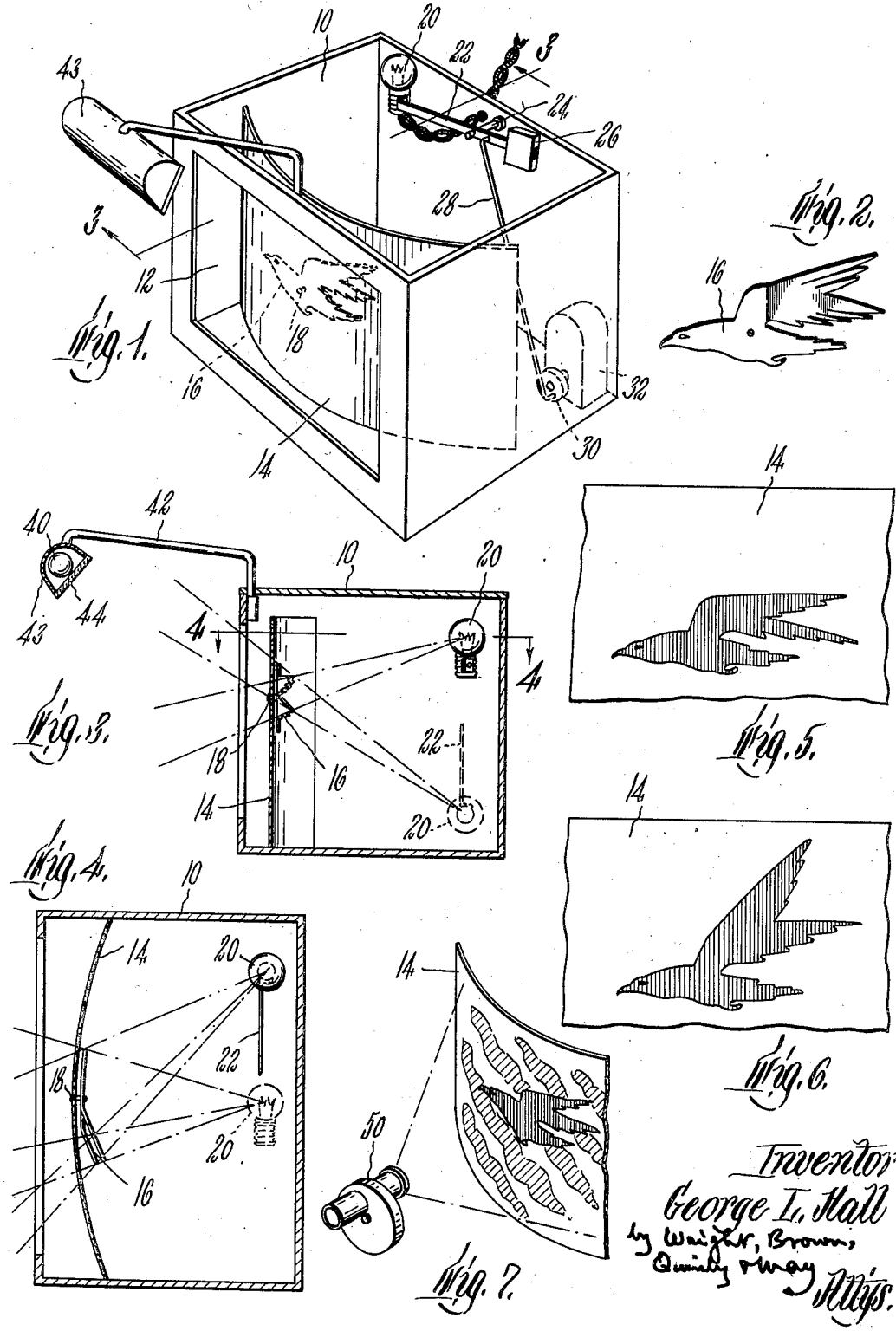
Inventor
George L. Hall
by Wright, Brown,
Quinby & May
Attys.

Patented Sept. 26, 1939

2,173,939

UNITED STATES PATENT OFFICE 2,173,939

LUMINOUS ADVERTISING DEVICE

George L. Hall, Melrose, Mass.

Application May 7, 1937, Serial No. 141,282

2 Claims. (Cl. 40—130)

This invention relates to a device for producing on a luminous screen a luminous image to which is imparted appropriate movement. The invention comprises improvements in the apparatus shown and described in my pending application Serial No. 136,551, filed April 13, 1937.

It is an object of the present invention to project light from various sources on a translucent screen in such a manner as to form a luminous image on the screen against a luminous background of other color or colors, and to produce movements in the image for the purpose of attracting attention and thus enhancing the value of the device as an advertising medium.

An opaque or translucent object, preferably of sheet material, is mounted behind and adjacent to a translucent screen. A light source is given predetermined movement behind the object, causing the object to cast a moving shadow image on the screen, as described in my said pending application Serial No. 136,551. According to the present invention, light of a different color is cast upon the screen from a source of light in front of the screen. By a suitable choice of colors and intensities of the light sources, the light source in front of the screen may be effective to illuminate the shadow image on the screen, its illuminating effect on the rest of the screen being obliterated or at least greatly modified by the light transmitted therethrough from the light source behind the screen. Thus, for example, a luminous red image of a bird can be produced on a luminous white background and can be given movements to simulate flying.

Furthermore, according to the invention, the illusion of progress of flying, for example, can be produced by projecting onto the front of the screen a moving or drifting image of clouds superimposed on the image of the bird. It is evident that images of other objects may be cast on the screen and may be given appropriate movements.

For a more complete understanding of the invention, reference may be had to the disclosure thereof in the following description of an embodiment thereof, and in the drawing of which Figure 1 is a perspective view of an embodiment of the invention.

Figure 2 is a perspective view of a shadow-casting object.

Figure 3 is a section on the line 3—3 of Figure 1.

Figure 4 is a section on the line 4—4 of Figure 3.

Figures 5 and 6 are fragmentary front elevations of the screen showing the silhouette image thereon in different positions.

Figure 7 is a perspective view of the screen shown in Figure 1, and a representation of a projecting means for varying images.

The invention may include a cabinet 10 having an open front 12 in which is a translucent screen 14. The screen 14 is preferably convexed or bulged either spherically or cylindrically to minimize blurring and distortion of the image cast thereon. A suitable shadow-casting object is mounted behind the screen 14. This object may be of any desirable or suitable size or shape. By way of illustration, a flying bird 16 is illustrated in Figure 2. This bird may be made of opaque or translucent material so as to cast a shadow on the screen 14 when the screen is illuminated from behind. While the invention is not limited to any particular material or materials, the shadow-casting object may conveniently be made of sheet metal which can be readily cut to the desired shape. Any suitable means may be employed for supporting the object 16 adjacent to the rear surface of the screen 14. As shown, one or more bolts or rivets 18 may be employed for this purpose. At the rear of the cabinet 10 a suitable light source 20, such as an electric light bulb, is provided. This light source, shining on the rear face of the screen, causes the object 16 to cast a silhouette image on the screen, the remainder of the screen being illuminated by light which is transmitted therethrough from the light source to the observer. If the light 20 is made to move, as for example in a plane parallel to the rear wall of the cabinet, the shadow image of the object 16 moves on the screen 14, the character and extent of such movement depending upon the path of movement of the light and the spacing of the object from the screen. In order to impart to portions of the shadow image greater movement than to other portions, parts of the object 16 may be spaced at a greater distance from the screen than other parts. For example, the portion of the object 16 representing the wings of a flying bird are bent away from the screen so as to be spaced therefrom a greater distance than the body portion of the object. Thus the shadow image of the wings is given a greater range of movement on the screen than the body portion of the shadow image, producing the effect of flying motion on the part of the bird which is depicted in the shadow image on the screen.

Any suitable apparatus may be employed for imparting desired movement to the light source 20. As illustrated in Figure 1, an electric lamp is mounted on the end of a rocking arm 22 which is adapted to rock about a pivot member 24. A counterweight 26 may be provided to balance the lamp. Rocking movement may be imparted by a pitman 28 reciprocated by a wheel 30 rotated by a small electric motor 32 or by any other convenient means. Thus the electric lamp, which is a source of light 20, may be made to rock through an approximate quadrant, the effect being to produce the illusion of flying movement in the image cast upon the screen.

The apparatus thus far described, with the exception of the convexity of the screen, is disclosed and claimed in my said pending application Serial No. 136,551. According to the present invention, which includes the use of a convex screen to minimize distortion and blurring of the shadow image, a supplementary light source 40 is mounted in front of the cabinet so as to shine upon the front face of the screen 14. This light source may be supported as by a bracket 42 above the screen or may be mounted at the foot of the screen so as to shine upwardly thereon, and is preferably screened from the observer by a conventional shield or hood 43. The light source 40 is of a different character from the light source 20 in that it may be a light of the same color but of different intensity or may be a light of different color. For example, the light source 20 within the cabinet may be white, the light source 40 in front of the screen being red or some other desired color. The color may be produced by the use of colored glass in the light bulb itself, by a color screen 44, or by the use of naturally colored lights such as neon tubes, sodium tubes, and the like. Whatever the colors may be, the intensity of the light cast on the front of the screen by the source 40 is preferably less than that of the light cast upon the rear of the screen by the source 20. In such case, the transmitted light either obliterates or greatly modifies the light from the source 40 falling upon the portion of the screen illuminated by transmitted light from the source 20. Since, however, if the object 16 is opaque, no light reaches the shadow portion of the screen from the source 20, this shadow portion is made luminous solely by the light from the source 40 which is reflected to the observer. The resultant effect where the source 20 is white and the source 40 is red is a luminous red image upon a luminous white background. It is evident that many different combinations of colors and shades may readily be obtained by suitable choice of lamps for the sources 20 and 40.

A further striking effect may be produced upon the screen by projecting thereon a varying or moving image to be superimposed upon and blended with the luminous shadow image cast by the object 16. In Figure 7 there is conventionally illustrated a projecting mechanism 50 adapted to project upon the screen a moving image of clouds, for example. Projectors of this kind are well known in the art and need not be described or illustrated in detail. This projector may be operated so as to cause a varying image of clouds to drift slowly from one side of the screen 14 to the other side, the image of the clouds showing more conspicuously on the shadow image than on the portion of the screen which is illustrated by transmitted light. Thus, as illustrated in Figure 7, the illusion may be produced of a bird flying rapidly through thin clouds.

It is evident that other illusions may be produced as, for example, of a ship sailing through a succession of waves. It is further evident that various other modifications and changes may be made in the specific embodiment of the invention herein shown and described without departing from the spirit or scope thereof as defined in the following claims.

I claim:

1. A device of the class described, comprising a translucent screen, means including a light source behind said screen for casting a silhouette image thereon, a light source in front of the screen arranged to cast light thereon of lesser intensity than the transmitted light, and means in front of the screen for casting thereon a varying luminous image superimposed on said silhouette image.

2. A device of the class described, comprising a translucent screen, an object behind and adjacent to said screen, at least a portion of said object being spaced from the screen, a light source behind said object cooperating therewith to cast a silhouette image on the screen, means for imparting motion to said light source whereby said image is made to move on said screen, a light source in front of said screen adapted to cast thereon light of a character differing from that of the transmitted light whereby said image is made luminous by reflected light contrasting with the transmitted light, and means in front of the screen for projecting thereon a varying image to blend with said luminous silhouette image.

GEORGE L. HALL.